(12) United States Patent
Jiang et al.

(10) Patent No.: US 12,386,891 B2
(45) Date of Patent: Aug. 12, 2025

(54) INFORMATION SEARCH METHOD AND DEVICE, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Wenbin Jiang, Beijing (CN); Yajuan Lyu, Beijing (CN); Yong Zhu, Beijing (CN); Hua Wu, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 433 days.

(21) Appl. No.: 17/932,598

(22) Filed: Sep. 15, 2022

(65) Prior Publication Data
US 2023/0008897 A1    Jan. 12, 2023

(30) Foreign Application Priority Data
Sep. 18, 2021  (CN) .......................... 202111101827.8

(51) Int. Cl.
*G06F 16/735*    (2019.01)
(52) U.S. Cl.
CPC ................. *G06F 16/735* (2019.01)
(58) Field of Classification Search
CPC ...... G06F 16/735; G06F 16/75; G06F 16/783; G06F 16/9535; G06F 16/9536; G06Q 50/01
See application file for complete search history.

(56) References Cited

U.S. PATENT DOCUMENTS 6,970,860 B1 * 11/2005 Liu ....................... G06F 16/583
7,263,671 B2 *  8/2007 Hull ...................... G06F 40/186
                                                          715/764
(Continued)

FOREIGN PATENT DOCUMENTS

CN    110225368 A    9/2019
CN    110866184 A    3/2020
(Continued)

OTHER PUBLICATIONS

Tadas Baltrusaitis et al, "Multimodal Machine Learning: A Survey and Taxonomy", IEEE, vol. 41, No. 2, Feb. 2019, pp. 423-443 (Year: 2019).*

(Continued)

*Primary Examiner* — Jared M Bibbee
(74) *Attorney, Agent, or Firm* — Hodgson Russ LLP

(57) ABSTRACT

An information search method includes: obtaining search words at least including a question to be searched and obtaining an initial text vector representation of the search words; obtaining a video corresponding to the search words, and obtaining multi-modality vector representations of the video; starting from the initial text vector representation, performing N rounds of interaction between the video and the search words based on the multi-modality vector representations and a text vector representation of the search words of a current round, to generate a target fusion vector representation, where N is an integer greater than or equal to 1; and obtaining target video frames matching the question to be searched by annotating the video based on the target fusion vector representation.

16 Claims, 7 Drawing Sheets

(56) References Cited

U.S. PATENT DOCUMENTS

| | | | |
|---|---|---|---|
| 7,315,857 B2* | 1/2008 | Dettinger | G06F 16/24573 707/999.005 |
| 7,446,803 B2* | 11/2008 | Leow | G08B 13/19673 348/E7.086 |
| 2004/0123231 A1* | 6/2004 | Adams, Jr. | G06F 40/169 715/202 |
| 2004/0205482 A1* | 10/2004 | Basu | G06F 40/169 715/201 |
| 2006/0195858 A1* | 8/2006 | Takahashi | G01C 21/3647 725/19 |
| 2009/0319883 A1* | 12/2009 | Mei | G06F 16/70 707/E17.014 |
| 2012/0278337 A1* | 11/2012 | Acharya | G06F 16/24578 707/E17.101 |
| 2013/0060784 A1* | 3/2013 | Acharya | G06F 16/7844 707/E17.014 |
| 2015/0296228 A1* | 10/2015 | Chen | H04N 21/8126 725/34 |
| 2020/0104318 A1* | 4/2020 | Ponjou Tasse | G06F 16/48 |
| 2021/0200802 A1* | 7/2021 | Lyu | G11B 27/10 |
| 2021/0248375 A1* | 8/2021 | Geng | G06F 16/9035 |
| 2022/0222920 A1* | 7/2022 | Huang | G06V 10/76 |

FOREIGN PATENT DOCUMENTS

| | | |
|---|---|---|
| CN | 111382309 A | 7/2020 |
| CN | 112364204 A | 2/2021 |
| CN | 112668559 A | 4/2021 |
| CN | 113010740 A | 6/2021 |
| CN | 113392265 A | 9/2021 |

OTHER PUBLICATIONS

Ameen Ali et al, "Video and Text Matching with Conditioned Embeddings", IEEE, pp. 478-487 (Year: 2022).*

EPO, Extended European Search Report for EP Application No. 22196154.3, Feb. 8, 2023.

CNIPA, First Office Action for CN Application No. 202111101827.8, Jun. 16, 2023.

* cited by examiner

INFORMATION SEARCH METHOD AND DEVICE, ELECTRONIC DEVICE, AND STORAGE MEDIUM

CROSS REFERENCE TO RELATED APPLICATIONS

This application claims priority to Chinese Application No. 202111101827.8, filed on Sep. 18, 2021, the entire disclosure of which is incorporated herein by reference.

TECHNICAL FIELD

The disclosure relates to fields of deep learning, natural language processing and knowledge graphs in a technical field of artificial intelligence, and more particularly, to a method and a device for searching for information, an electronic device and a storage medium.

BACKGROUND

Artificial intelligence technology is used to simulate, extend and expand human intelligence. The process of video question and answering based on artificial intelligence technology is just like when people is watching a video, they will obtain information such as objects, environment, text and other information that appear in the video frames.

Video is a widely used information bearing form on the Internet. Artificial intelligence applications that take the video as an object to be processed have significant value. The video question and answering is defined as a process of finding a suitable answer for a given question asked based on a given video, by obtaining the visual features and semantic features of the given video and the given question. The video question and answering aims to help people purposefully obtain the information they need from video clips.

SUMMARY

According to a first aspect, an information search method is provided. The method includes: obtaining search words at least including a question to be searched and obtaining an initial text vector representation of the search words; obtaining a video corresponding to the search words, and obtaining multi-modality vector representations of the video; starting from the initial text vector representation, performing N rounds of interaction between the video and the search words based on the multi-modality vector representations and a text vector representation of the search words of an i-th round of interaction, to generate a target fusion vector representation, where N is an integer greater than or equal to 1 and i is an integer greater than or equal to 1 and less than or equal to N; and obtaining target video frames matching the question to be searched by annotating the video based on the target fusion vector representation.

According to a second aspect, an electronic device is provided. The electronic device includes at least one processor; and a memory communicatively connected to the at least one processor. The memory stores instructions executable by the at least one processor. When the instructions are executed by the at least one processor, the at least one processor is caused to execute the information search method described in the first aspect of the disclosure.

According to a third aspect, a non-transitory computer-readable storage medium is provided. The storage medium has computer instruction stored thereon. The computer instructions are configured to cause a computer to perform the information search method according to the first aspect of the disclosure.

It understandable that what is described in this section is not intended to identify key or critical features of embodiments of the disclosure, nor is it intended to limit the scope of the disclosure. Other features of the disclosure will become readily understood from the following description.

BRIEF DESCRIPTION OF THE DRAWINGS

The accompanying drawings are used for better understanding of the technical solution of the disclosure, and do not constitute a limitation to the disclosure.

DETAILED DESCRIPTION

Figure 1:
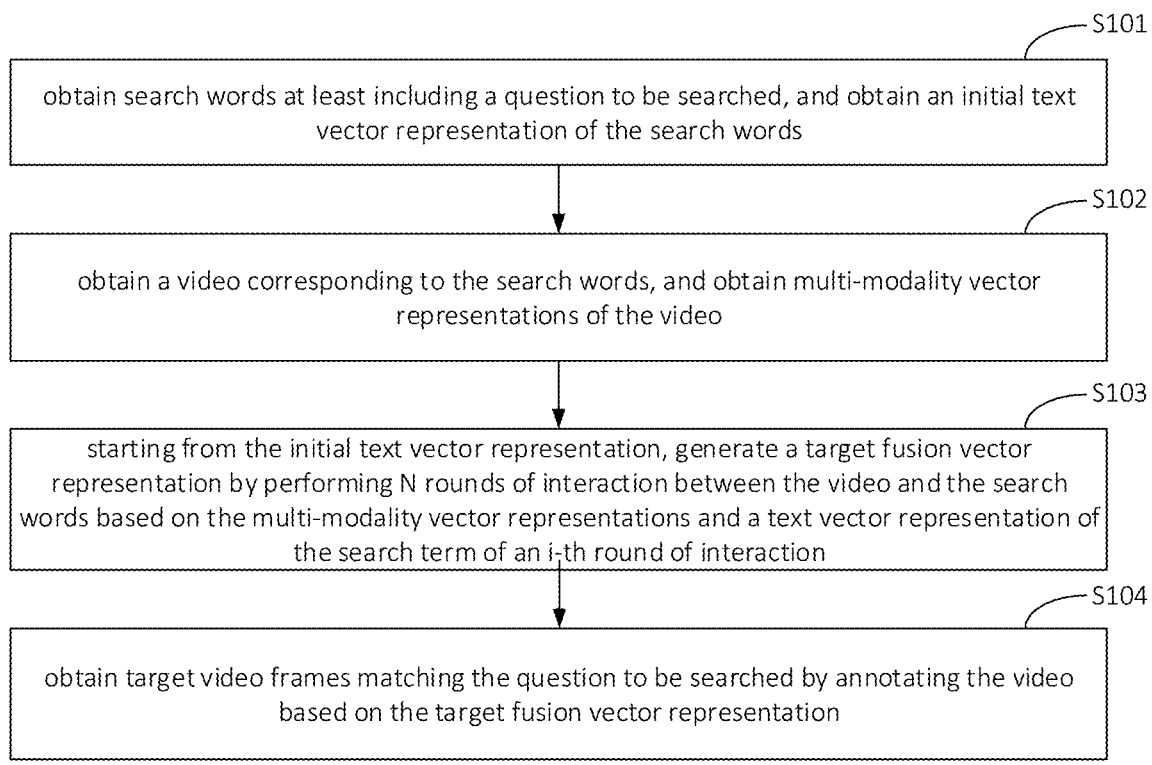
FIG. 1 is a schematic flowchart illustrating an information search method according to some examples of the disclosure.

Embodiments of the disclosure are described below with reference to the accompanying drawings, which include various details of the embodiments of the disclosure to facilitate understanding and should be considered as examples merely. Accordingly, those of ordinary skill in the art will recognize that various changes and modifications of the embodiments described herein can be made without departing from the scope and spirit of the disclosure. Also, descriptions of well-known functions and constructions are omitted from the following description for clarity and conciseness.

Artificial Intelligence (AI) is a technical science that studies and develops theories, methods, technologies and application systems for simulating, extending and expanding human intelligence. At present, AI technology has the advantages of high degree of automation, high accuracy and low cost, and has been widely used.

Deep Learning (DL) is a new research direction in the field of Machine Learning (ML), which learns the inherent laws and representation levels of sample data. The information obtained in the learning process assists a lot for the interpretation of data such as text, images and sounds. Its ultimate goal is to enable machines to have the ability to analyze and learn like humans, and to recognize data such as text, images, and sounds. As far as the specific research content is concerned, it mainly includes neural network systems based on convolution operations, namely convolutional neural networks; auto-encoding neural networks based on multi-layer neurons; pre-training in the form of multi-layer auto-encoding neural networks, and then combined with discriminative information to further optimize the deep confidence network of the neural network weights. Deep learning has achieved many achievements in search technology, data mining, machine learning, machine translation, natural language processing, multimedia learning, speech, recommendation and personalization technology, and other related fields. Deep learning enables machines to imitate human activities such as audio-visual and thinking, solves many complex pattern recognition problems, and makes great progress in artificial intelligence-related technologies.

Natural Language Processing (NLP) is an important direction in the fields of computer science and artificial intelligence. It mainly studies various theories and methods that can realize effective communication between humans and computers using natural language. Natural language processing is a science that integrates linguistics, computer science, and mathematics. Therefore, research in this field will involve natural language, the language that people use on a daily basis, so it is closely related to the study of linguistics, but with important differences. Natural language processing is not the general study of natural language, but the development of computer systems that can effectively realize natural language communication, especially the software systems therein. Hence it is part of computer science.

Knowledge Graph is a modern theory that combines the theories and methods of disciplines, such as applied mathematics, graphics, information visualization technology and information science, with methods such as metrology citation analysis or co-occurrence analysis, and vividly displays the core structure, the development history, the frontier fields, and the overall knowledge structure through a visual graph, to achieve the purpose of multidisciplinary integration. The knowledge graph describes the knowledge resources and their carriers through visualization technology, and mines, analyzes, constructs, draws and displays the knowledge and their interrelationships.

In related art, in the current video question and answering application scenario, the effect of information search is not ideal. Therefore, an information search method, an information search apparatus, an electronic device, and a storage medium are provided, which will be described below with reference to the accompanying drawings.

FIG. 1 is a schematic flowchart illustrating an information search method according to some examples of the disclosure.

As illustrated in FIG. 1, the information search method according to some examples of the disclosure may include the following steps.

In step S101, search words at least including a question to be searched are obtained, and an initial text vector representation of the search words is obtained.

The execution subject of the information search method according to the examples of the disclosure is an information search apparatus according to the examples of the disclosure. The information search apparatus may be a hardware device with data information processing capability and/or software required for driving the hardware device to work. Alternatively, the executive subject may include a workstation, a server, a computer, a user terminal and other devices. The user terminal includes but is not limited to a mobile phone, a computer, an intelligent voice interaction device, a smart home appliance, a vehicle-mounted terminal, and the like.

Alternatively, the method may be applied to a video question and answering scenario. Information related to a pre-provided question is obtained from the video. For example, the pre-provided question is "Is there a cat" or a keyword is "cat". With the information search method according to the examples of the disclosure, information such as video frames related to "cats" can be obtained from the video.

In a specific implementation, the initial text vector representation of search words provided by the user can be obtained. The search words include but are not limited to the question to be searched. For example, in the above example, "Is there a cat" or the "cat" can be used as the search words.

Alternatively, the initial text vector representation of the search words can be generated based on the word embedding process. That is, the words (e.g. the search words) represented by the natural language are converted into vectors or a vector sequence (also called a vector representation) that can be used for machine learning.

In step S102, a video corresponding to the search words is obtained, and multi-modality vector representations of the video are obtained.

Alternatively, the video may be a video provided by the user and corresponding to the search words or a video obtained from a server or a cloud end based on the search terms provided by the user and corresponding to the search words. The information search method according to the examples of the disclosure can perform the information search on the video to obtain the information associated with the search words from the video.

The multi-modality vector representations of the video are obtained by performing multi-dimensional feature extraction on the obtained video corresponding to the search words. That is, the features of the video in various modalities, such as text, sound, video and other modalities, are converted into vector representations that can be used for the machine learning. The multi-modality vector representations can include a video-modality vector representation, a text-modality vector representation, or a sound-modality vector representation. Multiple modality types to be acquired can be set as required, which is not limited in the disclosure.

In step S103, starting from the initial text vector representation, N rounds of interaction is performed between the video and the search words based on the multi-modality vector representations and a text vector representation of the search words of a current (or i-th) round, to generate a target fusion vector representation, where N is an integer greater than or equal to 1 and i is an integer greater than or equal to 1 and less than or equal to N.

In order to enhance an effect of extracting information from the video, the N rounds of interaction between the video and the search words is performed, that is, at least one round of interaction between the video and the search words is performed to fully exploit a mutual relationship between the video and the search words.

As an implementation, the process of performing an initial round of interaction between the video and the search words can be described as follows. The video information reading is performed on the multi-modality vector representations of the video obtained in the step S102 based on the initial text vector representation obtained in the step S101, such as reading the information of the video modality and the information of the text modality, to obtain information that has a high correlation with the initial text vector representation. Information fusion process is performed on the obtained video information and the text information to obtain a fusion vector representation, and the text vector representation is updated based on the fusion vector representation. Until now, the initial round of interaction ends.

A next round of interaction is performed based on the most recently updated text vector representation, the interaction process is the same as that of the initial round described above, and will not be repeated here. The interaction process is repeated for N times, and the fusion vector representation generated in the last round of interaction is determined as the target fusion vector representation, where N is a natural number greater than 0, and the number of interactions N can be set as required, which is not limited in the disclosure.

In step S104, target video frames matching the question to be searched are obtained by annotating the video based on the target fusion vector representation.

Annotating the video based on the target fusion vector representation generated in the step S103 may be annotating a sequence of video frames of the video to obtain the target video frames matching the question to be searched.

In conclusion, with the information search method according to the examples of the disclosure, the search words at least including the question to be searched is obtained, the initial text vector representation of the search words is obtained, the video corresponding to the search words is obtained, and the multi-modality vector representations of the video are obtained. From the initial text vector representation, the N rounds of interaction are performed between the video and the search words according to the multi-modality vector representations and the text vector representation of the search words of the current round to generate the target fusion vector representation. Based on the target fusion vector representation, the video is annotated to obtain the target video frames matching the question to be searched. Through the N rounds of interaction between the video and the search words, multi-layer iterative understanding of the question to be searched and the video corresponding to the question to be searched is realized, and the effect of information search is enhanced.

Figure 2:
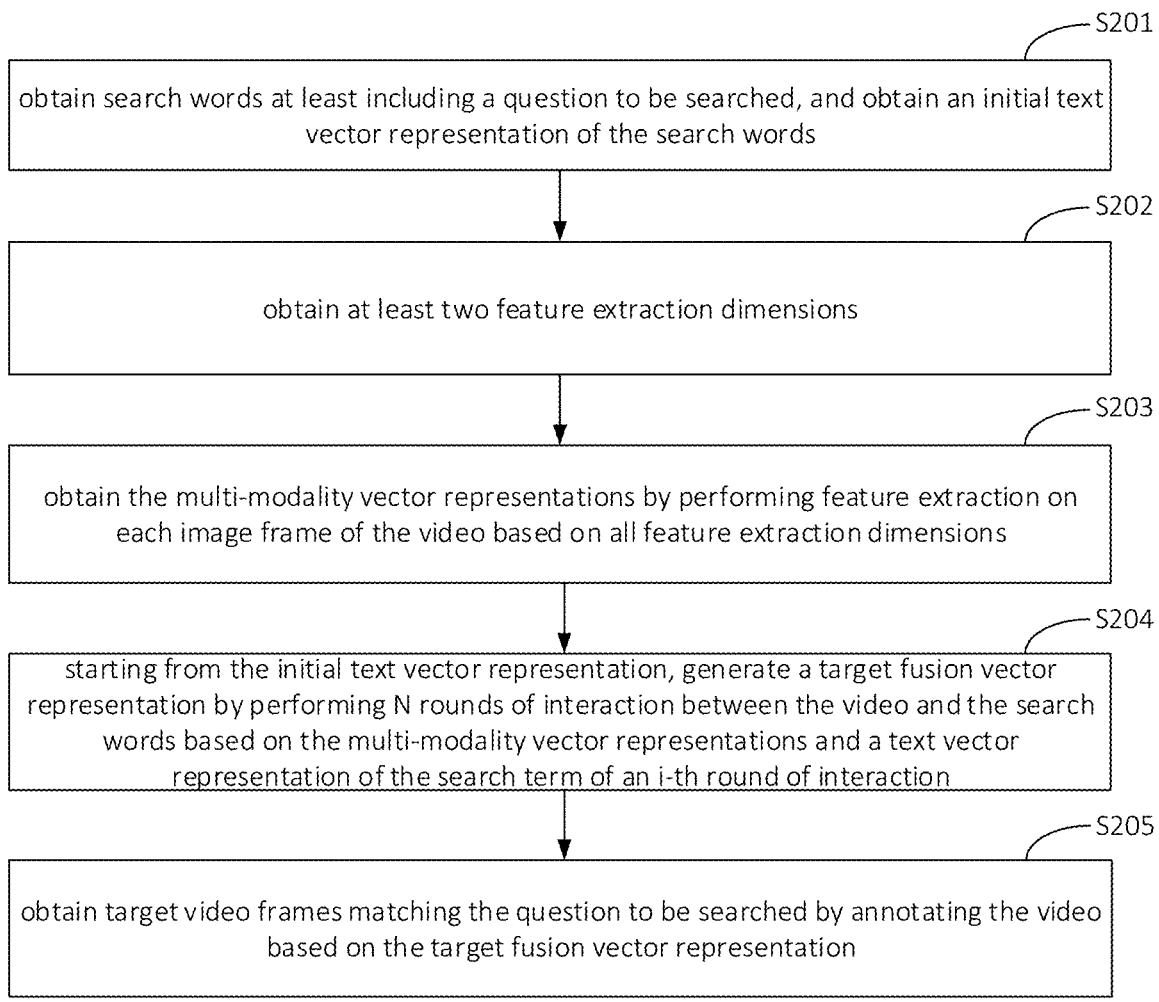
FIG. 2 is a schematic flowchart illustrating an information search method according to some examples of the disclosure.

FIG. 2 is a schematic flowchart illustrating an information search method according to some examples of the disclosure.

As illustrated in FIG. 2, on the basis of embodiments of FIG. 1, the information search method according to the examples of the disclosure may include the following steps.

In step S201, search words at least including a question to be searched are obtained and an initial text vector representation of the search words is obtained.

The step S201 is the same as the step S101 in the foregoing embodiment, and the step S102 in the foregoing embodiment may include the following steps S202 and S203.

In step S202, at least two feature extraction dimensions are acquired.

Alternatively, the video includes features such as color, audio, texture, and text. Various dimensions of features of the video can be extracted. In order to ensure the effect of information search, at least two dimensions can be selected.

The feature extraction dimensions may include but are not limited to at least one of the following: video dimension, text dimension and sound dimension. It is noteworthy that that the number of dimensions and the feature types corresponding to the dimensions are not limited here.

In step S203, feature extraction is performed on each image frame of the video based on all feature extraction dimensions to obtain the multi-modality vector representations.

In a specific implementation, the multi-modality vector representations are generated by performing the feature extraction on each image frame of the video corresponding to the search words according to each feature extraction dimension obtained in the step S202. For example, the feature extraction is performed on the video based on the text dimension to generate a text-modality vector representation, the feature extraction is performed on the video based on the sound dimension to generate a sound-modality vector representation, and the feature extraction is performed on the video based on the video dimension to generate a video-modality vector representation. The text-modality vector representation, the sound-modality vector representation and the video-modality vector representation collectively form the multi-modality vector representations.

In step S204, starting from the initial text vector representation, N rounds of interaction are performed between the video and the search words according to the multi-modality vector representations and a text vector representation of the search words of a current (or i-th) round, to generate a target fusion vector representation, where N is an integer greater than or equal to 1.

In step S205, target video frames matching the question to be searched are obtained by annotating the video based on the target fusion vector representation.

The step S204 is the same as the step S103 in the foregoing embodiment, and the step S205 is the same as the step S104 in the foregoing embodiment, which will not be repeated here.

In conclusion, with the information search method according to the examples of the disclosure, the search words at least including the question to be searched are obtained, the initial text vector representation of the search words is obtained, the video corresponding to the search words is obtained, and the multi-modality vector representations of the video are obtained. From the initial text vector representation, the N rounds of interaction are performed between the video and the search words according to the multi-modality vector representations and the text vector representation of the search words of the current round to generate the target fusion vector representation. Based on the target fusion vector representation, the video is annotated to obtain the target video frames matching the question to be searched. Through the N rounds of interaction between the video and the search words, multi-layer iterative understanding of the question to be searched and the video corresponding to the question to be searched is realized, and the effect of information search is enhanced.

In specific implementation, valid information such as video clips or video frames related to the search words can be obtained from the video provided by the user through the information search method according to the examples of FIG. 1. As another feasible implementation, several candidate answers can also be provided at the same time when the question to be searched is given, both the question to be searched and the candidate answers are used as the search words. With the information search method according to the examples of the disclosure, the valid information, such as the video clips or the video frames, associated with the question to be searched and the candidate answers is obtained from the video according to the question to be searched and the candidate answers, the candidate answers are judged, and a candidate answer with higher accuracy is selected from the candidate answers as a target answer. In conclusion, the search words may include the question to be searched, or both the question to be searched and the candidate answers.

Figure 3:
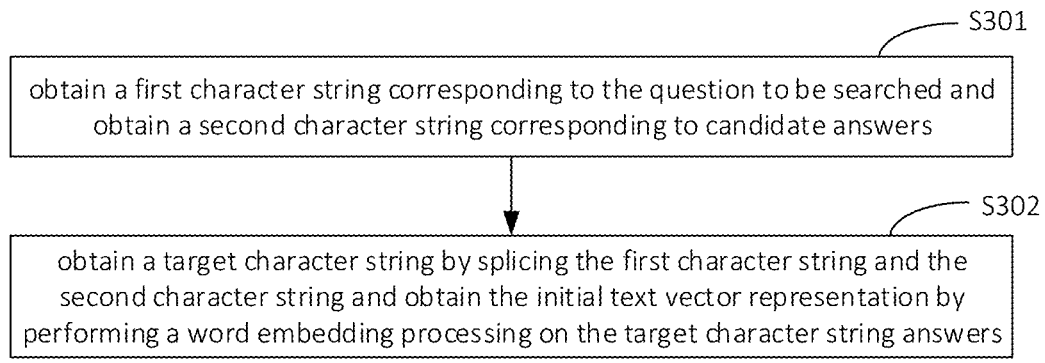
FIG. 3 is a schematic flowchart illustrating an information search method according to some examples of the disclosure.

Further, on the basis of the examples of FIG. 2, the search words may further include multiple candidate answers. As illustrated in FIG. 3, the step S201 of obtaining the initial text vector representation of the search words may include the following steps.

In step S301, a first character string corresponding to the question to be searched is obtained, and a second character string corresponding to the candidate answers is obtained.

Alternatively, in addition to the question to be searched, the search words may further include the candidate answers. The first character string $\chi_1 = \{a_1, \ldots a_i\}$ corresponding to the question to be searched and the second character string $\chi_2 = \{b_1, \ldots b_j\}$ corresponding to the candidate answers can be obtained by performing word segmentation on the question to be searched and the candidate answers respectively.

In step S302, the first character string is spliced with the second character string to obtain a target character string. The initial text vector representation is obtained by performing word embedding processing on the target character string.

The first character string $\chi_1$ is spliced with the second character string $\chi_2$ to obtain the target character string $\chi$. As a feasible splicing method, $\chi$ can be expressed as $\chi = \{a_1, \ldots a_i, b_1, \ldots b_j\}$. The word embedding is performed on the target characters to generate the initial text vector representation $X = \{x_1, \ldots x_i, x_{i+1}, \ldots x_{i+j}\}$, where $x_n$ represents a vector corresponding to each target character contained in the target character string, where $n = 1, \ldots i+j$.

Figure 4:
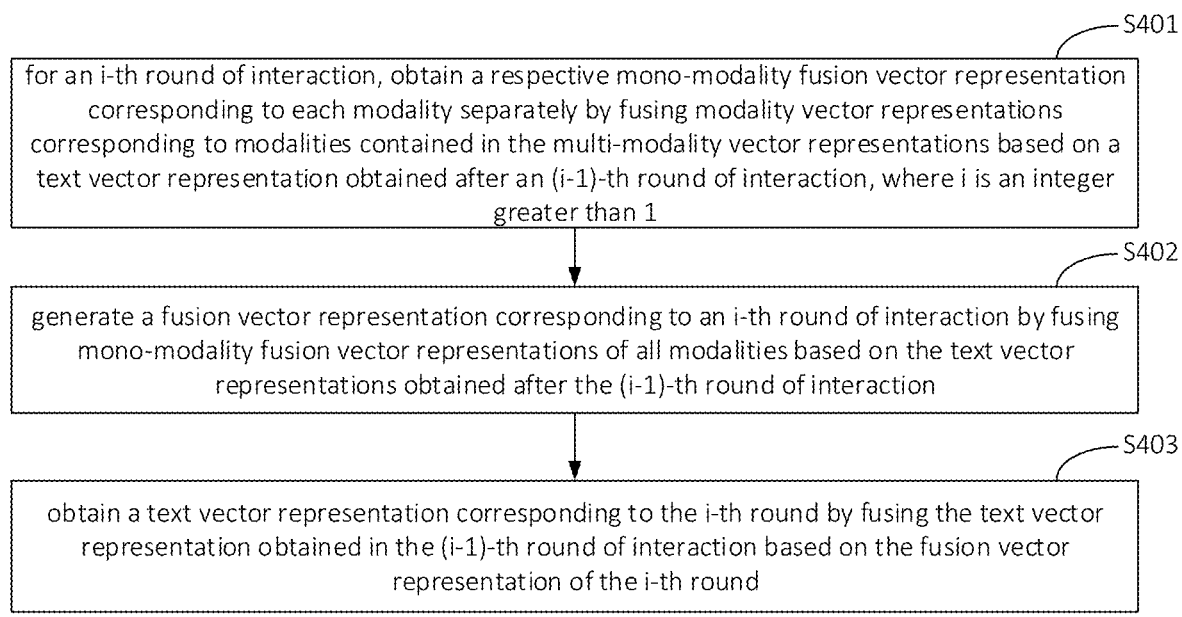
FIG. 4 is a schematic flowchart illustrating an information search method according to some examples of the disclosure.

Further, as illustrated in FIG. 4, on the basis of the examples of FIG. 2, the step S204 of generating the target fusion vector representation by performing the N rounds of interaction between the video and the search words based on the multi-modality vector representations and the text vector representation of the search words of the current round includes the following steps.

In step S401, for an i-th round of interaction, modality vector representations corresponding to respective modalities contained in the multi-modality vector representations are fused to separately obtain a mono-modality fusion vector representation of each modality based on the text vector representation obtained after the (i−1)-th round of interaction, where i is an integer greater than 1.

In the specific implementation, for example, for the N-th round of interaction, separately for each modality contained in the multi-modality vector representations, the modality vector representation corresponding to the modality is fused based on the text vector representation $H_{N-1}$ obtained after the (i−1)-th round (i.e. in this case the (i−1)-th round is the (N−1)-th round) of interaction. For example, if the obtained multi-modality vector representations include the video-modality vector representation O and the text-modality vector representation T, the modality vector representation corresponding to the video modality (i.e. the video-modality vector representation O) is fused, and the modality vector representation corresponding to the text modality (i.e. the text-modality vector representation T) is fused. It is noteworthy that in the multi-modality vector representations, there may be a plurality of vector representations corresponding to each modality, that is, the video-modality vector representation O and the text-modality vector representation T are each a vector sequence composed of many vectors, where the sequence length of the vector sequence corresponds to a video length.

As a feasible implementation, based on the attention mechanism, the modality information is read from the multi-modality vector representations according to the text vector representation $H_{N-1}$, and the read modality information is fused to obtain a mono-modality fusion vector representation. For example, all the vector sequences contained in the video-modality vector representation O are fused to obtain a mono-modality fusion vector representation $R_V$ corresponding to the video modality, and likewise, all the vector sequences contained in the text-modality vector representation T are fused to obtain a mono-modality fusion vector representation $R_T$ corresponding to the text modality.

In step S402, respective mono-modality fusion vector representations corresponding to all modalities are fused based on the text vector representation obtained after the (i−1)-th round of interaction, to obtain a fusion vector representation corresponding to the i-th round.

Alternatively, the above-mentioned "all modalities" are for example the video modality and the text modality. Based on a normalization function, such as SoftMax, the mono-modality fusion vector representation $R_V$ corresponding to the video modality and the mono-modality fusion vector representation $R_T$ corresponding to the text modality are fused based on the text vector representation $H_{N-1}$ obtained after the (i−1)-th round of interaction, to obtain the fusion vector representation $R_{VT}$ corresponding to the current round.

Further, on the basis of the above-mentioned examples, the information search method according to the examples of the disclosure may further include the following steps.

In step S403, the text vector representation corresponding to the current (i.e. the i-th) round is obtained by fusing the text vector representation obtained after the (i−1)-th round of interaction based on the fusion vector representation corresponding to the current round.

Alternatively, based on the attention mechanism, the text vector representation $H_{N-1}$ obtained after the (i−1)-th round of interaction is fused based on the fusion vector representation $R_{VT}$ corresponding to the current round to obtain the text vector representation $H_N$ corresponding to the current round, thereby realizing the update of the text vector representation.

Figure 5:
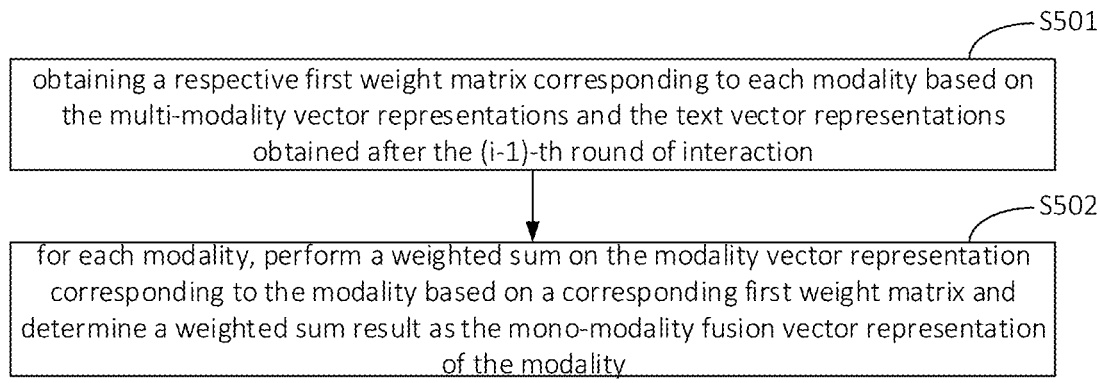
FIG. 5 is a schematic flowchart illustrating an information search method according to some examples of the disclosure.

Further, on the basis of the above-mentioned examples, as illustrated in FIG. 5, the step S401 of "for each modality, obtaining the mono-modality vector representation corresponding to the modality by fusing separately the modality vector representation corresponding to the modality contained in the multi-modality vector representations based on the text vector representation obtained after the (i−1)-th round of interaction" includes the following steps.

In step S501, for each modality, a first weight matrix corresponding to the modality is obtained respectively based on the multi-modality vector representations and the text vector representation obtained after the (i−1)-th round of interaction.

Alternatively, the first weight matrix $W_V$ corresponding to the video modality is obtained based on the video-modality vector representation O and the text vector representation $H_{N-1}$ obtained after the (i−1)-th round of interaction, and the first weight matrix $W_T$ corresponding to the text modality is obtained based on the text-modality vector representation T and the text vector representation $H_{N-1}$ obtained after the (i−1)-th round of interaction. That is, the respective importance degrees (or respective weights) of the modality vector representations corresponding to the modalities with respect to $H_{N-1}$ are obtained. The first weight matrices $W_V$ and $W_T$ can be obtained by the following formulas:

$$W_V = \text{Attention}(Q=H_{N-1}, K=O, V=O);$$

$$W_T = \text{Attention}(Q=H_{N-1}, K=T, V=T).$$

where Q represents the parameter Query in the attention mechanism, K represents the parameter Key in the attention mechanism, and V represents the parameter Value in the attention mechanism.

In step S502, a weighted sum is performed on the modality vector representation corresponding to the modality based on the first weight matrix and a weighted sum result corresponding to the modality is determined as the mono-modality fusion vector representation of the corresponding modality.

As a feasible implementation, the video-modality vector representation O is weighted based on the first weight matrix $W_V$ corresponding to the video modality, and the weighted sum result is taken as the mono-modality fusion vector representation $R_V$ of the video modality. Similarly, the text-modality vector representation T is weighted based on the first weight matrix $W_T$ corresponding to the text modality, and the weighted sum result is taken as the mono-modality fusion vector representation $R_T$ of the text modality. The specific calculation formula of the mono-modality fusion vector representation of the video modality is as follows:

$$R_V = \text{SUM}(O*W_V);$$

and the specific calculation formula of the mono-modality fusion vector representation of the text modality is as follows:

$$R_T = \text{SUM}(T*W_T).$$

Figure 6:
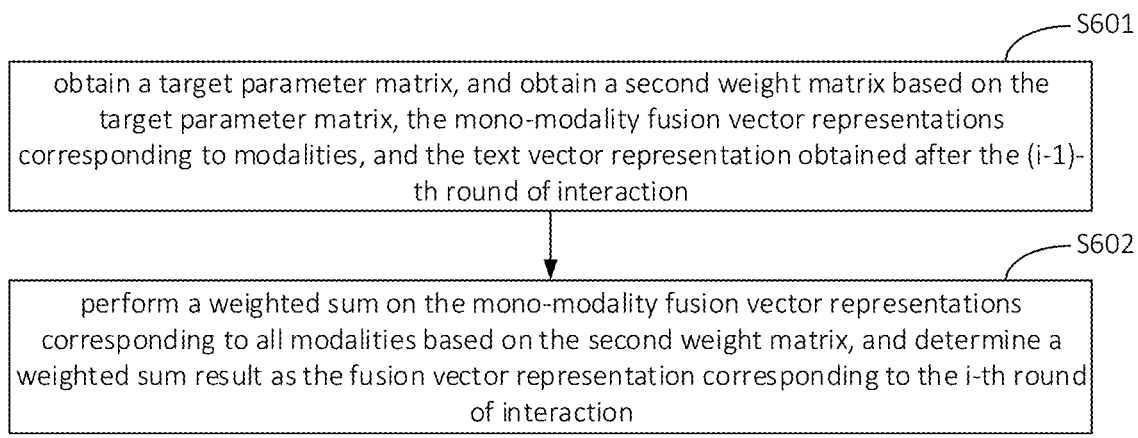
FIG. 6 is a schematic flowchart illustrating an information search method according to some examples of the disclosure.

Further, on the basis of the above-mentioned examples, as illustrated in FIG. 6, the step S402 of "obtaining the fusion vector representation corresponding to the current round by fusing respective mono-modality fusion vector representations corresponding to all modalities based on the text vector representation obtained after the (i−1)-th round of interaction" specifically includes the following steps.

In step S601, a target parameter matrix is obtained, and a second weight matrix is obtained based on the target parameter matrix, the mono-modality fusion vector representations corresponding to the modalities, and the text vector representation obtained after the (i−1)-th round of interaction.

As a feasible implementation, an automatically learned parameter matrix $M_{VT}$ is obtained as the target parameter matrix. The second weight matrix $W_{VT}$ is obtained by performing the inner product operation and the SoftMax function based on the target parameter matrix $M_{VT}$, the mono-modality fusion vector representation $R_V$ corresponding to the video modality, and the mono-modality fusion vector representation $R_T$ corresponding to the text modality, and the text vector representation obtained after the (i−1)-th round of interaction. The calculation formula of the second weight matrix is as follows:

$$W_{VT} = \text{SoftMax}([R_V M_{VT} H_{N-1}, R_T M_{VT} H_{N-1}]).$$

In step S602, a weighted sum is performed on the respective mono-modality fusion vector representations corresponding to all modalities based on the second weight matrix, and a weighted sum result is determined as the fusion vector representation corresponding to the current round.

Specifically, the mono-modality fusion vector representation $R_V$ corresponding to the video modality and the mono-modality fusion vector representation $R_T$ corresponding to the text modality are weighted based on the second weight matrix $W_{VT}$ obtained in step S601, and the weighted sum $R_{VT}$ is determined as the fusion vector representation of the current round. The specific calculation formula of the fusion vector representation obtained based on the video modality and the text modality is as follows:

$$R_{VT} = \text{SUM}([R_V, R_T]*W_{VT}).$$

Figure 7:
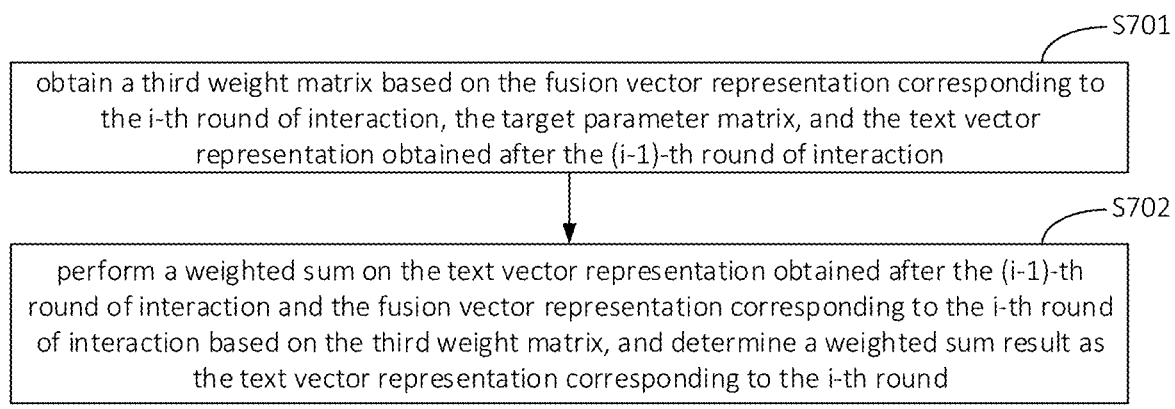
FIG. 7 is a schematic flowchart illustrating an information search method according to some examples of the disclosure.

Further, on the basis of the above-mentioned examples, as illustrated in FIG. 7, the step S403 of "obtaining the text vector representation of the current round by fusing the text vector representation obtained after the (i−1)-th round of interaction based on the fusion vector representation corresponding to the current round" specifically includes the following steps.

In step S701, a third weight matrix is obtained based on the fusion vector representation corresponding to the current round, the target parameter matrix, and the text vector representation obtained after the (i−1)-th round of interaction.

Alternatively, on the basis of the above-mentioned examples, the third weight matrix $W_{VTH}$ is obtained by performing the inner product and the SoftMax function on the fusion vector representation $R_{VT}$ corresponding to the current round, the target parameter matrix $M_{VT}$ and the text vector representation $H_{N-1}$ obtained after the (i−1)-th round of interaction. The calculation formula of the third weight matrix is as follows:

$$W_{VTH} = \text{SoftMax}([R_{VT} M_{VT} H_{N-1}, H_{N-1} M_{VT} H_{N-1}]).$$

In step S702, a weighted sum is performed the text vector representation obtained after the (i−1)-th round of interaction and the fusion vector representation corresponding to the current round based on the third weight matrix, and a weighted sum result is determined as the text vector representation corresponding to the current round.

Alternatively, the text vector representation $H_{N-1}$ obtained after the (i−1)-th round of interaction and the fusion vector representation $R_{VT}$ corresponding to the current round are weighted based on the third weight matrix obtained in step S701, and the weighted sum result is determined as the text vector representation $H_N$ corresponding to the current round. The specific calculation formula is as follows:

$$H_N = \text{SUM}([R_{VT}, H_{N-1}]*W_{VTH}).$$

It is noteworthy that the above-mentioned examples of FIG. 4 to FIG. 7 describe the process of performing one round of interaction between the video and the search words, and N rounds of interaction can be performed in turn in accordance with the above process. The multi-modality vector representations are not limited to the video-modality vector representation and the text-modality vector representation. If the multi-modality vector representations include modality vector representations corresponding to any other modalities, the process of performing the interaction between the video and the search words is the same as the interaction described in the above-mentioned examples of FIG. 4 to FIG. 7, which is not repeated here.

Further, in the disclosure, after the N rounds of interaction between the video and the question to be searched are completed, while generating the target fusion vector representation, the text vector representation obtained through multiple rounds of understanding and updating can also be generated. The text vector representation includes the text vector representation of the search words and the text vector representation of the candidate answers.

As a possible implementation, the text vector representation obtained after the N-th round of interaction can be obtained, that is, the text vector representation obtained after the last round of interaction can be obtained. The text vector representation obtained after the N-th round of interaction can be annotated to obtain text annotation results of the search words and the text annotation results of the candidate answers.

It is noteworthy that, if the search words only include the question to be searched, the text vector representation of the search words obtained after the N-th round of interaction can be obtained, and the text vector representation of the search words obtained after the N-th round of interaction can be annotated to obtain the text annotation results of the search words.

Figure 8:
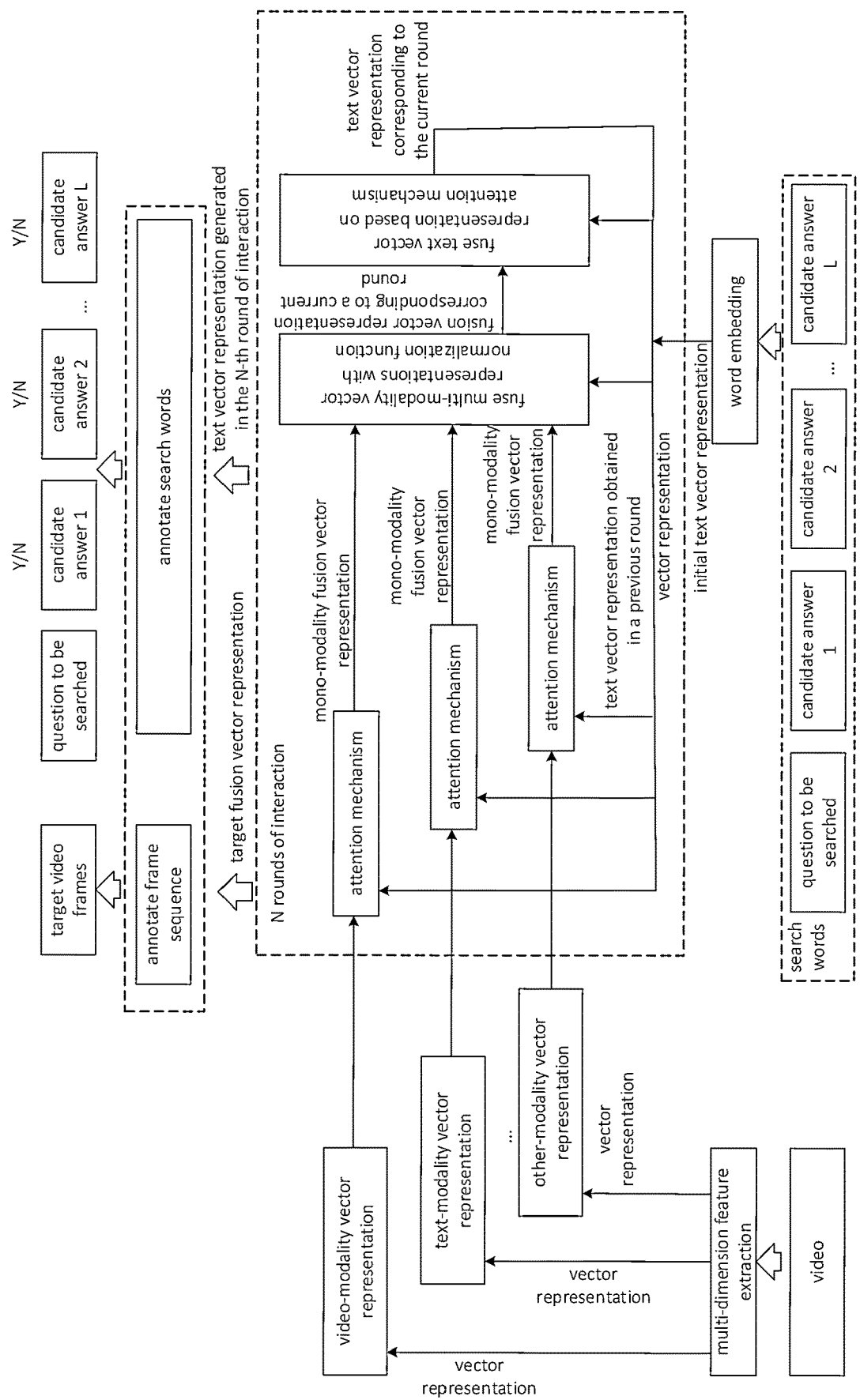
FIG. 8 is a schematic diagram illustrating a scenario of an information search method according to some examples of the disclosure.
Figure 9:
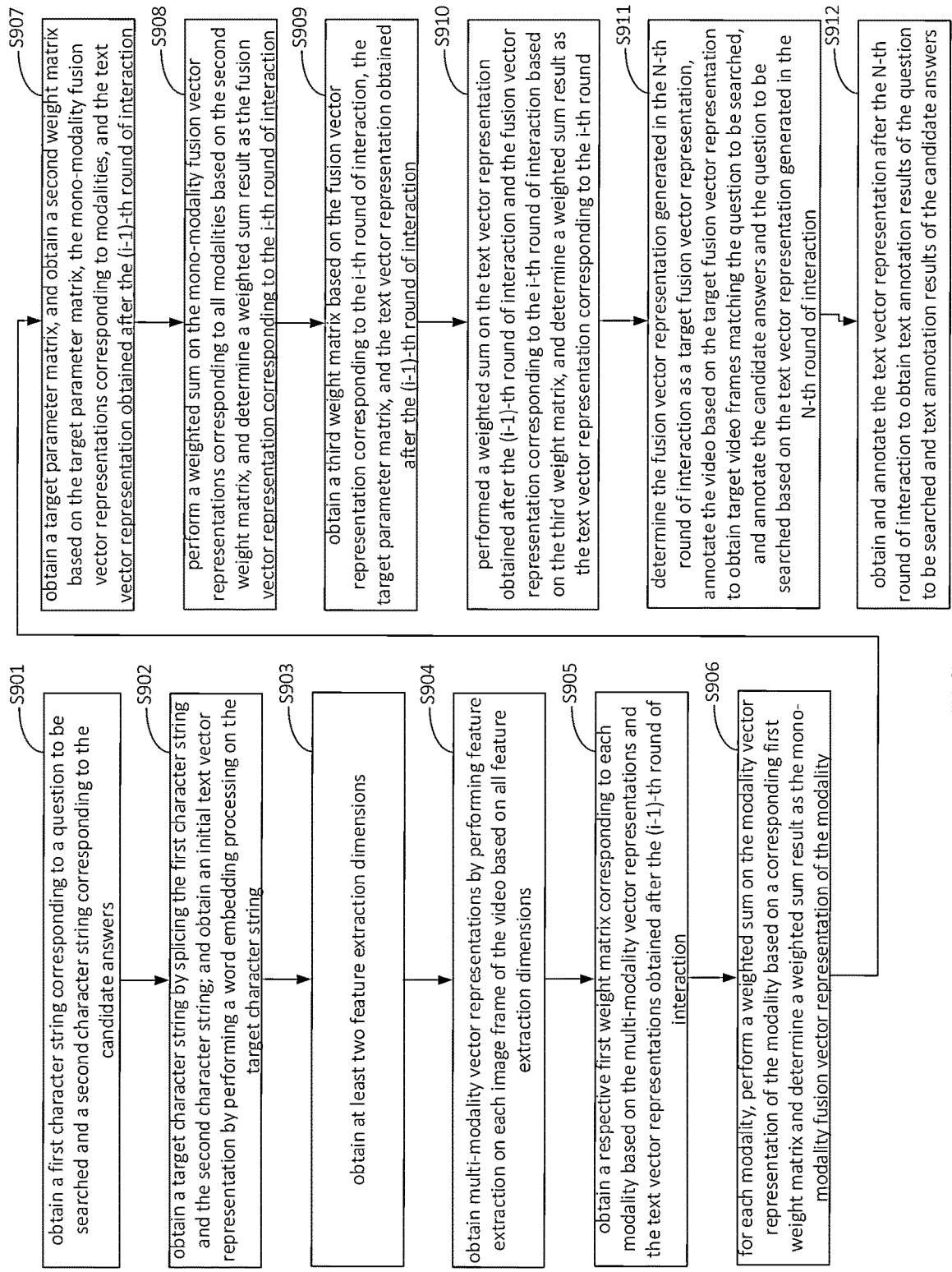
FIG. 9 is a schematic diagram illustrating an information search method according to some examples of the disclosure.

In order to clearly illustrate the information search method according to the examples of the disclosure, the following is a detailed description with reference to FIGS. 8 to 9. As illustrated in FIG. 8, the question to be searched and N candidate answers are used as the search words to undergo word embedding processing through the embedding layer to generate the initial text vector representation, and at the same time, multi-dimensional feature extraction is performed on the video corresponding to the search words based on multiple feature extraction dimensions to generate multi-modality vector representations. The first round of interaction is performed between the video and the search words according to the initial text vector representation. The text vector representation of the second round is generated when the first round of interaction is completed, the text vector representation of the third round is generated when the second round of interaction is completed, and so on. The process of each round of interaction between the video and the search words is as follows. The mono-modality fusion vector representation corresponding to each modality is generated respectively by fusing the multi-modality vector representations based on the text vector representation obtained after the (i−1)-th round of interaction using the attention mechanism (note, for the first round, the text vector representation obtained after the (i−1)-th round refers to the initial text vector representation), and respective mono-modality fusion vector representations corresponding to all modalities are fused to obtain the fusion vector representation corresponding to the current round. The text vector representation obtained after the (i−1)-the round of interaction is fused based on the fusion vector representation according to the attention mechanism to obtain the text vector representation corresponding to the current round. The target fusion vector representation obtained after the N rounds of interaction and the text vector representation obtained after the N-th round of interaction are used to annotate the video and the candidate answers. Specifically, the start frame and the end frame of the video or the video clip can be annotated, and the candidate answers are annotated with "correct" (Y) or "wrong" (N), and at the same time, the content of the answer to be searched can be marked with the degree of understanding, so as to obtain the target video frames that matches the question to be searched and the candidate answers with high accuracy.

FIG. 9 is a schematic flowchart illustrating an information search method according to some examples of the disclosure. As illustrated in FIG. 9, the information search method specifically includes the following steps.

In step S901, a first character string corresponding to a question to be searched is obtained, and a second character string corresponding to candidate answers is obtained.

In step S902, the first character string is spliced with the second character string to obtain a target character string, and word embedding processing is performed on the target character string to obtain an initial text vector representation.

In step S903, at least two feature extraction dimensions are acquired.

In step S904, feature extraction is performed on each image frame of the video according to all feature extraction dimensions to obtain multi-modality vector representations.

Starting from the initial text vector representation, N rounds of interactive loops are performed between the video and the search words.

In step S905, respective first weight matrices corresponding to the modalities are obtained respectively based on the multi-modality vector representations and a text vector representation obtained after an (i−1)-th round of interaction.

In step S906, the modality vector representation corresponding to each modality is weighted respectively based on a corresponding first weight matrix, and a weighted sum result is determined as a mono-modality fusion vector representation of the modality.

In step S907, a target parameter matrix is obtained, and a second weight matrix is obtained based on the target parameter matrix, the mono-modality fusion vector representations corresponding to the modalities, and the text vector representation obtained after the (i−1)-th round of interaction.

In step S908, the mono-modality fusion vector representations corresponding to all modalities are weighted based on the second weight matrix, and a weighted sum result is determined as a fusion vector representation corresponding to the current round.

In step S909, a third weight matrix is obtained based on the fusion vector representation corresponding to the current round, the target parameter matrix and the text vector representation obtained after the (i−1)-th round of interaction.

In step S910, the text vector representation obtained after the (i−1)-th round of interaction and the fusion vector representation corresponding to the current round are weighted based on the third weight matrix, and a weighted sum result is determined as the text vector representation corresponding to the current round.

In step S911, the fusion vector representation generated by the N-th round of interaction is determined as the target fusion vector representation, the video is annotated based on the target fusion vector representation, to obtain the target video frames matching the question to be searched, and the candidate answers and the question to be searched are annotated based on the text vector generated by the N-th round of interaction.

In step S912, the text vector representation obtained after the N-th round of interaction is obtained, the text vector representation obtained after the N-th round of interaction is annotated, to obtain the text annotation results of the search words and the text annotation results of the candidate answers.

Figure 10:
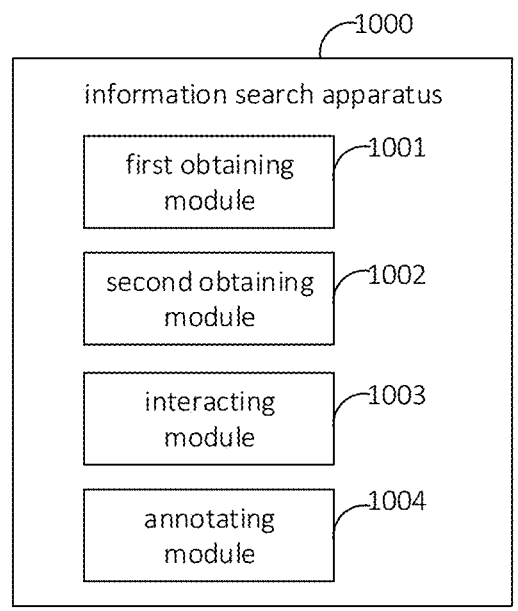
FIG. 10 is a block diagram illustrating an information search apparatus according to some examples of the disclosure.

FIG. 10 is a block diagram illustrating an information search apparatus according to some examples of the disclosure.

As illustrated in FIG. 10, the information search apparatus 1000 includes: a first obtaining module 1001, a second obtaining module 1002, an interacting module 1003, and an annotating module 1004.

The first obtaining module 1001 is configured to obtain search words at least including a question to be searched, and obtain an initial text vector representation of the search words.

The second obtaining module 1002 is configured to obtain a video corresponding to the search words, and obtain multi-modality vector representations of the video.

The interacting module 1003 is used to starting from the initial text vector representation, generate a target fusion vector representation by performing N rounds of interaction between the video and the search words based on the multi-modality vector representations and the text vector representation of the search words of a current round, where, N is an integer greater than or equal to 1.

The annotating module 1004 is configured to obtain target video frames matching the question to be searched by annotating the video based on the target fusion vector representation.

Further, the second obtaining module 1002 is further configured to: obtain at least two feature extraction dimensions; and obtain the multi-modality vector representations by performing feature extraction on each image frame of the video according to all the feature extraction dimensions.

Further, the interacting module 1003 is further configured to: for an i-th round of interaction, obtain a mono-modality fusion vector representation corresponding to each modality separately by fusing modality vector representations corresponding to the modalities contained in the multi-modality vector representations based on the text vector representation obtained after a (i−1)-th round of interaction; and obtain the fusion vector representation corresponding to the current round by fusing the mono-modality vector representations corresponding to all modalities based on the text vector representation obtained after the (i−1)-th round of interaction.

Further, the interacting module 1003 is further configured to: obtain the text vector representation corresponding to the current round by fusing the text vector representation obtained after the (i−1)-th round of interaction based on the fusion vector representation corresponding to the current round.

Further, the interacting module 1003 is further configured to: for each modality, obtain a first weight matrix corresponding to the modality according to the modality vector representation corresponding to the modality and the text vector representation obtained after the (i−1)-th round of interaction; weight the modality vector representation corresponding to the modality based on the first weight matrix, and determine a weighted sum result as the mono-modality fusion vector representation corresponding to the modality.

Further, the interacting module 1003 is further configured to: obtain a target parameter matrix, obtain a second weight matrix based on the target parameter matrix, the mono-modality fusion vector representations corresponding to the modalities, and the text vector representation obtained after the (i−1)-th round of interaction; and weight the mono-modality fusion vector representations of all modalities based on the second weight matrix, and determine a weighted sum as the fusion vector representation corresponding to the current round.

Further, the interacting module 1003 is further configured to: obtain a third weight matrix based on the fusion vector representation corresponding to the current round, the target parameter matrix and the text vector representation obtained after the (i−1)-th round of interaction; weight the text vector representation obtained after the (i−1)-th round of interaction and the fusion vector representation corresponding to the current round based on the third weight matrix, and determine a weighted sum result as the text vector representation corresponding to the current round.

Further, the feature extraction dimensions include at least one of a video dimension, a text dimension, or a sound dimension.

Further, the search words further include candidate answers. The first obtaining module 1001 is further configured to: obtain the first character string corresponding to the question to be searched and the second character string corresponding to the candidate answers; spice the first character string and the second character string to obtain a target string; and perform word embedding on the target string to obtain the initial text vector representation.

Further, the annotating module 1004 is further configured to: obtain the text vector representation obtained after the N-th round of interaction, and annotate the text vector representation obtained after the N-th round of interaction, to obtain text annotation results of the search words and text annotation results of the candidate answers.

In conclusion, the information search apparatus according to the examples of the disclosure, the search words at least including the question to be searched is obtained, the initial text vector representation of the search words is obtained, the video corresponding to the search words is obtained, and the multi-modality vector representations of the video are obtained. From the initial text vector representation, the N rounds of interaction are performed between the video and the search words according to the multi-modality vector representations and the text vector representation of the search words of the current round to generate the target fusion vector representation. Based on the target fusion vector representation, the video is annotated to obtain the target video frames matching the question to be searched. Through the N rounds of interaction between the video and the search words, multi-layer iterative understanding of the question to be searched and the video corresponding to the question to be searched is realized, and the effect of information search is enhanced.

In the technical solution of the disclosure, the collection, storage, use, processing, transmission, provision and disclosure of the user's personal information involved are all in compliance with the relevant laws and regulations, and do not violate public order and good customs.

According to embodiments of the disclosure, there is also provided an electronic device, a readable storage medium, and a computer program product.

Figure 11:
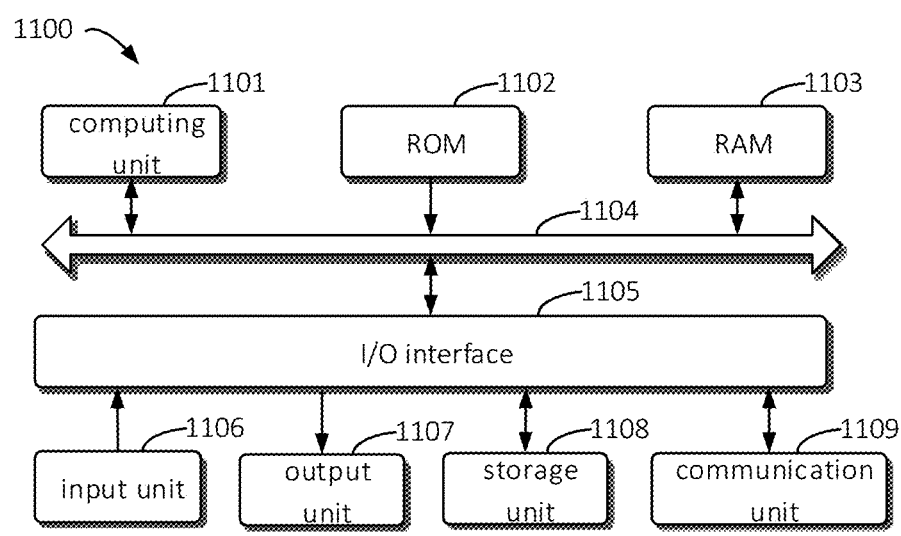
FIG. 11 is a block diagram illustrating an electronic device configured to perform an information search method according to some examples of the disclosure.

FIG. 11 is a block diagram illustrating an electronic device 1100 configured to perform the information search method according to some examples of the disclosure. Electronic devices are intended to represent various forms of digital computers, such as laptop computers, desktop computers, workstations, personal digital assistants, servers, blade servers, mainframe computers, and other suitable computers. Electronic devices may also represent various forms of mobile devices, such as personal digital processors, cellular phones, smart phones, wearable devices, and other similar computing devices. The components, their connections and relationships, and their functions shown herein are by way of example only, and are not intended to limit implementations of the disclosure described and/or claimed herein.

As illustrated in FIG. 11, the electronic device 1100 includes a computing unit 1101 which can perform various suitable actions and processes based on computer programs stored in a read only memory (ROM) 1102 or computer programs loaded from a storage unit 1108 into a random access memory (RAM) 1103. In the RAM 1103, various programs and data necessary for the operation of the electronic device 1100 can also be stored. The computing unit 1101, the ROM 1102, and the RAM 1103 are connected to each other through a bus 1104. An input/output (I/O) interface 1105 is also connected to the bus 1104.

Various components in the electronic device 1100 are connected to the I/O interface 1105, including: an input unit 1106, such as a keyboard, a mouse, etc.; an output unit 1107, such as various types of displays, speakers, etc.; a storage unit 1108, such as a magnetic disk, an optical disk etc.; and a communication unit 1109, such as a network card, modem, wireless communication transceiver, and the like. The communication unit 1109 allows the electronic device 1100 to exchange information/data with other devices through a computer network such as the Internet and/or various telecommunication networks.

The computing unit 1101 may be a variety of general-purpose and/or special-purpose processing components having processing and computing capabilities. Some examples of the computing unit 1101 include, but are not limited to, central processing units (CPUs), graphics processing units (GPUs), various specialized artificial intelligence (AI) computing chips, various computing units that run machine learning model algorithms, digital signal processing processor (DSP), and any suitable processor, controller, microcontroller, etc. The computing unit 1101 executes the various methods and processes described above, such as the information search methods shown in FIGS. 1 to 9. For example, in some embodiments, the information search method may be implemented as a computer software program tangibly embodied on a machine-readable medium, such as storage unit 1108. In some embodiments, part or all of the computer program may be loaded and/or installed on the electronic device 1100 via the ROM 1102 and/or the communication unit 1109. When the computer program is loaded into RAM 1103 and executed by computing unit 1101, one or more steps of the information search method described above may be performed. Alternatively, in other embodiments, the computing unit 1101 may be configured to perform the information search method by any other suitable means (e.g., by means of firmware).

Various implementations of the systems and techniques described herein above may be implemented in digital electronic circuitry, integrated circuit systems, field programmable gate arrays (FPGAs), application specific integrated circuits (ASICs), application specific standard products (ASSPs), systems on chips system (SOC), load programmable logic device (CPLD), computer hardware, firmware, software, and/or combinations thereof. These various implementations may include being implemented in one or more computer programs that are executable and/or interpretable on a programmable system including at least one programmable processor. The programmable processor may be a special purpose or general-purpose programmable processor, may receive data and instructions from a storage system, at least one input device, and at least one output device, and transmit data and instructions to the storage system, the at least one input device, and the at least one output device.

Program codes for implementing the methods of the disclosure may be written in any combination of one or more programming languages. These program codes may be provided to a processor or controller of a general purpose computer, special purpose computer or other programmable data processing apparatus, such that the program codes, when executed by the processor or controller, cause the processor or the controller to perform the functions/functions specified in the flowcharts and/or block diagrams. The program codes may execute entirely on the machine, partly on the machine, partly on the machine and partly on a remote machine as a stand-alone software package, or entirely on the remote machine or server.

In the context of the disclosure, the machine-readable medium may be a tangible medium that may contain or store a program for use by or in connection with the instruction execution system, apparatus or device. The machine-readable medium may be a machine-readable signal medium or a machine-readable storage medium. The machine-readable media may include, but are not limited to, electronic, magnetic, optical, electromagnetic, infrared, or semiconductor systems, devices, or devices, or any suitable combination of the foregoing. More specific examples of machine-readable storage media would include one or more wire-based electrical connections, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination of the foregoing.

To interact with users, the systems and techniques described herein may be implemented on a computer having: a display device (e.g. a cathode ray tube (CRT) or liquid crystal display (LCD) monitor) for displaying information to the users; and a keyboard and pointing device (e.g. a mouse or a trackball) through which the users can provide input to the computer. Other kinds of devices can also be used to provide interaction with the user. For example, the feedback provided to the user can be any form of sensory feedback (e.g. visual feedback, auditory feedback, or tactile feedback) and can be in any form (including acoustic input, voice input, or tactile input) to receive input from the users.

The systems and techniques described herein can be implemented on a computing system (e.g. as a data server) that includes back-end components, or a computing system (e.g. as an application server) that includes middleware components, or a computing system (e.g. a user computer having a graphical user interface or web browser through which the users can interact with implementations of the systems and techniques described herein) that includes front-end components, or a computer system including a combination of such backend components, middleware components and front-end components. The components of the system may be interconnected by any form or medium of digital data communication (e.g. a communication network). Examples of communication networks include: Local Area Networks (LANs), Wide Area Networks (WANs), the Internet, and blockchain networks.

The computer system can include clients and servers. The clients and servers are generally remote from each other and usually interact through a communication network. The relationship of client and server arises by computer programs running on the respective computers and having a client-server relationship to each other. The server can be a cloud server, also known as a cloud computing server or a cloud host, which is a host product in the cloud computing service system to solve the problem of traditional physical hosts and VPS services ("Virtual Private Server", or "VPS" for short), and there are the defects of difficult management and weak business expansion. The server can also be a server of a distributed system, or a server combined with a blockchain.

According to examples of the disclosure, the disclosure also provides a computer program product, including a computer program. When the computer program is executed by a processor, the information search method according to the above-mentioned examples of the disclosure is performed.

It is understandable that steps may be reordered, added or deleted using the various forms of flowchart shown above. For example, the steps described in the disclosure can be executed in parallel, sequentially, or in different orders, as long as the desired results of the technical solutions disclosed in the disclosure can be achieved, no limitation is imposed herein.

The above-mentioned specific examples do not constitute a limitation on the protection scope of the disclosure. It is understandable by those skilled in the art that various modifications, combinations, sub-combinations and substitutions may occur depending on design requirements and other factors. Any modifications, equivalent replacements, and improvements made within the spirit and principles of the disclosure should be included within the protection scope of the disclosure.

What is claimed is:

1. An information search method, comprising:
obtaining search words at least comprising a question to be searched, and obtaining an initial text vector representation of the search words;
obtaining a video corresponding to the search words, and obtaining multi-modality vector representations of the video;
starting from the initial text vector representation, generating a target fusion vector representation by performing N rounds of interaction between the video and the search words based on the multi-modality vector representations and a text vector representation of the search term of an i-th round of interaction, where N is an integer greater than or equal to 1 and i is an integer greater than or equal to 1 and less than or equal to N; and
obtaining target video frames matching the question to be searched by annotating the video based on the target fusion vector representation;
wherein the search words further comprise candidate answers, and obtaining the initial text vector representation of the search words comprises:
obtaining a first character string corresponding to the question to be searched and obtaining a second character string corresponding to the candidate answers;
obtaining a target character string by splicing the first character string and the second character string; and
obtaining the initial text vector representation by performing a word embedding processing on the target character string;
wherein the method further comprises:
obtaining a text vector representation obtained after an N-th round of interaction; and
obtaining text annotation results of the search words and text annotation results of the candidate answers by annotating the text vector representation.

2. The method of claim 1, wherein obtaining the multi-modality vector representation of the video comprises:
obtaining at least two feature extraction dimensions; and
obtaining the multi-modality vector representations by performing feature extraction on each image frame of the video based on all of the at least two feature extraction dimensions.

3. The method of claim 1, wherein generating the target fusion vector representation comprises:
for the i-th round of interaction, obtaining a mono-modality fusion vector representation corresponding to each modality separately by fusing modality vector representations corresponding to respective modalities contained in the multi-modality vector representations based on a text vector representation obtained after an (i−1)-th round of interaction; and
generating a fusion vector representation corresponding to the i-th round of interaction by fusing mono-modality fusion vector representations of all modalities based on the text vector representations obtained after the (i−1)-th round of interaction.

4. The method of claim 3, further comprising:
obtaining a text vector representation corresponding to the i-th round by fusing the text vector representation obtained after the (i−1)-th round of interaction based on the fusion vector representation of the i-th round.

5. The method of claim 3, wherein obtaining the mono-modality fusion vector representation corresponding to each modality comprises: for each modality,
obtaining a first weight matrix corresponding to the modality based on the modality vector representations corresponding to respective modalities and the text vector representation obtained after the (i−1)-th round of interaction; and
performing a weighted sum on the modality vector representation corresponding to the modality based on the corresponding first weight matrix and determining a weighted sum result as the mono-modality fusion vector representation of the modality.

6. The method of claim 5, wherein obtaining the fusion vector representation corresponding to the i-th round of interaction comprises:
obtaining a target parameter matrix, and obtaining a second weight matrix based on the target parameter matrix, the mono-modality fusion vector representations corresponding to respective modalities, and the text vector representation obtained after the (i−1)-th round of interaction; and
performing a weighted sum on the mono-modality fusion vector representations corresponding to all modalities based on the second weight matrix, and determining a weighted sum result as the fusion vector representation corresponding to the i-th round of interaction.

7. The method of claim 6, wherein obtaining the text vector representation of the i-th round comprises:
obtaining a third weight matrix based on the fusion vector representation corresponding to the i-th round of interaction, the target parameter matrix, and the text vector representation obtained after the (i−1)-th round of interaction; and
performing a weighted sum on the text vector representation obtained after the (i−1)-th round of interaction and the fusion vector representation corresponding to the i-th round of interaction based on the third weight matrix, and determining a weighted sum result as the text vector representation corresponding to the i-th round.

8. The method of claim 2, wherein the feature extraction dimensions comprise at least one of a video dimension, a text dimension and a sound dimension.

9. An electronic device, comprising:
at least one processor; and
a memory, communicatively coupled to the at least one processor;
wherein, the memory stores instructions executable by the at least one processor, and when the instructions are executed by the at least one processor, the at least one processor is configured to:
obtain search words at least comprising a question to be searched, and obtain an initial text vector representation of the search words;
obtain a video corresponding to the search words, and obtain multi-modality vector representations of the video;
starting from the initial text vector representation, generate a target fusion vector representation by performing N rounds of interaction between the video and the search words based on the multi-modality vector representations and a text vector representation of the search term of an i-th round, where N is an integer greater than or equal to 1 and i is an integer greater than or equal to 1 and less than or equal to N; and
obtain target video frames matching the question to be searched by annotating the video based on the target fusion vector representation;
wherein the search words further comprise candidate answers, and the at least one processor is configured to:
obtain a first character string corresponding to the question to be searched and obtain a second character string corresponding to the candidate answers;
obtain a target character string by splicing the first character string and the second character string; and
obtain the initial text vector representation by performing a word embedding processing on the target character string;
wherein the at least one processor is configured to:
obtain a text vector representation obtained after an N-th round of interaction; and
obtain text annotation results of the search words and text annotation results of the candidate answers by annotating the text vector representation.

10. The electronic device of claim 9, wherein the at least one processor is configured to:
obtain at least two feature extraction dimensions; and
obtain the multi-modality vector representations by performing feature extraction on each image frame of the video based on all of the at least two feature extraction dimensions.

11. The electronic device of claim 9, wherein the at least one processor is configured to:
for the i-th round of interaction, obtain a mono-modality fusion vector representation corresponding to the modality separately by fusing modality vector representation corresponding to the modality contained in the multi-modality vector representations based on a text vector representation obtained after an (i−1)-th round of interaction, where i is an integer greater than 1; and
generate a fusion vector representation corresponding to the i-th round of interaction by fusing mono-modality fusion vector representations of all modalities based on the text vector representations obtained after the (i−1)-th round of interaction.

12. The electronic device of claim 11, wherein the at least one processor is configured to:
obtain a text vector representation corresponding to the i-th round by fusing the text vector representation obtained after the (i−1)-th round of interaction based on the fusion vector representation of the i-th round.

13. The electronic device of claim 11, wherein the at least one processor is configured to:
for each modality,
obtain a first weight matrix corresponding to the modality based on the modality vector representation corresponding to the modality and the text vector representations obtained after the (i−1)-th round of interaction; and
perform a weighted sum on the modality vector representation corresponding to the modality based on the first weight matrix and determine a weighted sum result as the mono-modality fusion vector representation of the modality.

14. The electronic device of claim 13, wherein the at least one processor is configured to:
obtain a target parameter matrix, and obtain a second weight matrix based on the target parameter matrix, the mono-modality fusion vector representations corresponding to respective modalities, and the text vector representation obtained after the (i−1)-th round of interaction; and
perform a weighted sum on the mono-modality fusion vector representations corresponding to all modalities based on the second weight matrix, and determine a weighted sum result as the fusion vector representation corresponding to the i-th round of interaction.

15. The electronic device of claim 14, wherein the at least one processor is configured to:
obtain a third weight matrix based on the fusion vector representation corresponding to the i-th round of interaction, the target parameter matrix, and the text vector representation obtained after the (i−1)-th round of interaction; and
perform a weighted sum on the text vector representation obtained after the (i−1)-th round of interaction and the fusion vector representation corresponding to the i-th round of interaction based on the third weight matrix, and determining a weighted sum result as the text vector representation corresponding to the i-th round.

16. A non-transitory computer readable storage medium, having computer instructions stored thereon, wherein the computer instructions are configured to cause a computer to perform an information search method, the method comprising:
obtaining search words at least comprising a question to be searched, and obtaining an initial text vector representation of the search words;
obtaining a video corresponding to the search words, and obtaining multi-modality vector representations of the video;
starting from the initial text vector representation, generating a target fusion vector representation by performing N rounds of interaction between the video and the search words based on the multi-modality vector representations and a text vector representation of the search term of an i-th round, where N is an integer greater than or equal to 1 and i is an integer greater than or equal to 1 and less than or equal to N; and
obtaining target video frames matching the question to be searched by annotating the video based on the target fusion vector representation;

wherein the search words further comprise candidate answers, and obtaining the initial text vector representation of the search words comprises:
  obtaining a first character string corresponding to the question to be searched and obtaining a second character string corresponding to the candidate answers;
  obtaining a target character string by splicing the first character string and the second character string; and
  obtaining the initial text vector representation by performing a word embedding processing on the target character string;
wherein the method further comprises:
  obtaining a text vector representation obtained after an N-th round of interaction; and
  obtaining text annotation results of the search words and text annotation results of the candidate answers by annotating the text vector representation.

\* \* \* \* \*